Figure 2B:
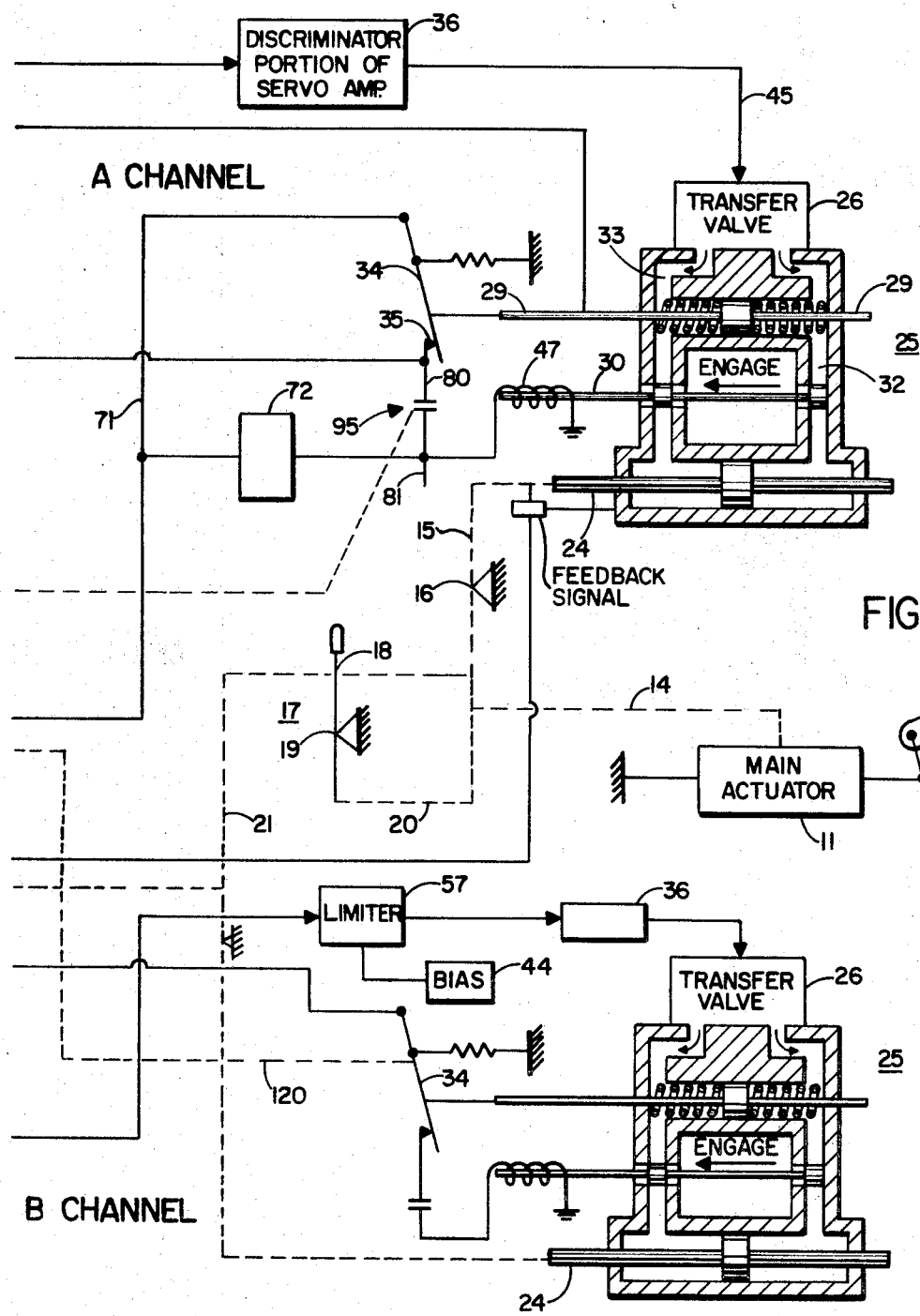

United States Patent

[11] 3,549,108

| [72] | Inventor | Frederick L. Smith<br>Minneapolis, Minn. |
|---|---|---|
| [21] | Appl. No. | 715,840 |
| [22] | Filed | Mar. 25, 1968 |
| [45] | Patented | Dec. 22, 1970 |
| [73] | Assignee | Honeywell, Inc.<br>Minneapolis, Minn.<br>a corporation of Delaware |

[54] CONTROL APPARATUS
12 Claims, 3 Drawing Figs.

[52] U.S. Cl. .................................................. 244/77,
318/20.080
[51] Int. Cl. .................................................... B64c 13/18
[50] Field of Search ......................................... 244/77M,S,
78; 318/20.080, 20.085; 91/363A, 1

[56] References Cited
UNITED STATES PATENTS

| 3,027,878 | 4/1962 | Keyt et al. ..................... | 244/78X |
| 3,051,416 | 8/1962 | Rotier ........................... | 244/77 |
| 3,436,035 | 4/1969 | Priestley ....................... | 244/77 |

*Primary Examiner*—Milton Buchler
*Assistant Examiner*—Jeffrey L. Forman
*Attorneys*—Roger W. Jensen, Charles J. Ungemach and Gordon Reed ABSTRACT: In condition control apparatus, such as flight condition control apparatus for an aircraft, a single monitoring system had previously monitored a flight condition of the craft, such as the craft normal acceleration, and had prevented application of control to the craft in excess of a magnitude of the control yielding maximum desired normal acceleration or flight condition. However, redundant monitoring systems, rather than but a single monitoring system, are herein provided to increase the reliability of monitoring the particular flight condition of the craft, since if one monitoring system fails, the other monitoring system may exert the desired limiting of the condition. In the event of actual failure of one of such monitoring control systems for controlling of the aircraft, the other or redundant system will assume control. Thus, by such redundant monitoring systems, the aircraft will have been able to complete its flight mission rather than aborting the mission on failure of one monitor. Thus, reliability of the aircraft has been increased by redundant methods.

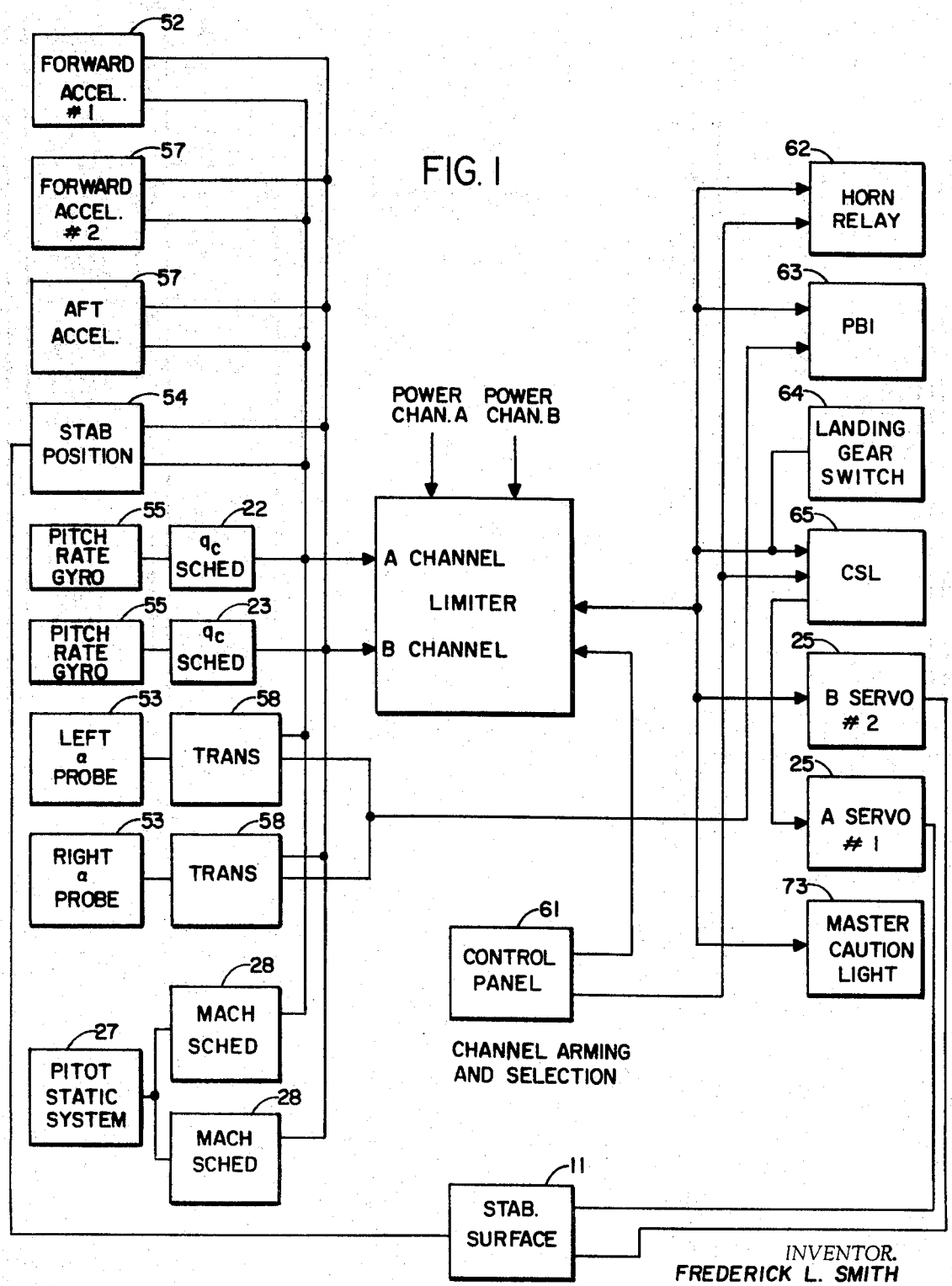
FIG. I

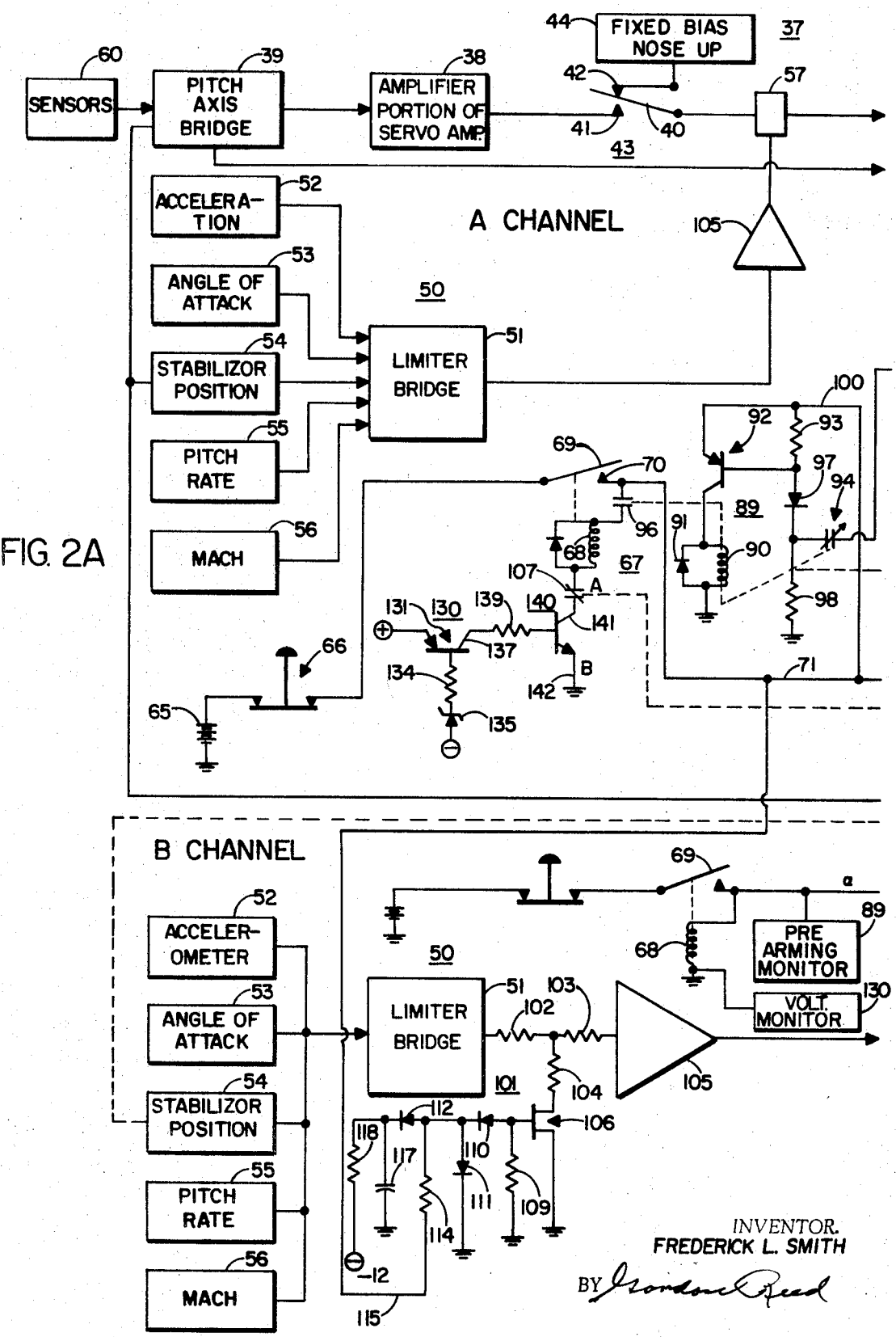

INVENTOR.
FREDERICK L. SMITH
BY Gordon Reed
ATTORNEY

CONTROL APPARATUS

BACKGROUND OF THE INVENTION

In control systems for aircraft for controlling flight conditions thereof a monitoring system had been provided to monitor the response of the craft to operation of its control surfaces. Such monitoring system included for example, sensors and related means which provide the actual magnitude of a condition of the aircraft, such as its normal acceleration. Provisions are included in such monitoring systems to prevent the craft from attaining a normal acceleration beyond a predetermined magnitude, thereby preventing overstressing of the aircraft. In such monitoring system the command signal to the flight control apparatus has a limited magnitude or is limited, but the command signal still controls the aircraft so that maximum performance of the craft is obtained without such performance resulting in exceeding a boundary such as its predetermined normal acceleration.

In the present arrangement, the reliability of the monitoring system has been increased in that in the event of a failure in one monitoring system another monitoring system is available to exert supervisory control of the control apparatus for the craft.

The invention herein for example is applicable to the form of single monitoring system for a control apparatus for an aircraft which is disclosed in U.S. Pat. No. 3,081,968 to Raymond H. Pesola assigned to the same assignee as the present application. In the Pesola patent, briefly from FIG. 1 for manual control, instead of autopilot control when the switch arm 40 engages its upper contact 42 and a proper bias has been applied from the source of bias 44, the pilot control stick 18 may be operated to control the main actuator 11 and control surface 10 to alter a flight condition of the craft about its lateral or pitch axis. At this time conventional fluid bypass means permits movement of piston 24 during operation of stick 18, e.g. there is no hydraulic lock. Various sensors 52—56 therein through their sensed signals provide a limit function varying with the condition. When this limit function from the limiter bridge 51 applied to the diode limiter 57 attains a predetermined magnitude, the output of discriminator 36 is altered and the servomotor transfer valve 26 is operated resulting in operation of a trim ram or piston 29 which operates a contact arm 34 into engagement condition with a contact 35. Under this condition of engagement and with the MCSL arming switch 69 in closed position, a solenoid 47 has a circuit from a battery 65 completed therethrough. The energization of the solenoid 47 operates a pilot valve 30 thus permitting the control of a main ram or main piston 24 by transfer valve 26 for operation through linkage 15 of the main actuator 11 and control surface 10 tending to move the surface in a downward direction, if the limit function predetermined magnitude be exceeded, all as described in column 5 of the Pesola patent.

To reduce upkeep, for example maintenance time, of the previous monitoring system and thereby increase the service life of the control apparatus an additional, redundant monitor channel similar to monitor 50 of Pesola has been provided herein. The resulting dual redundant limiter system mechanization thus consists of two identical parallel channels. One channel, the A channel, as channel 50 in Pesola, is the primary CSL—MCSL Control. The second channel, channel B, is the redundant or backup MSCL Control channel.

Channel A receives its primary power from the automatic pilot or control apparatus. This channel generates power for excitation of the conventional sensors such as an angle of attack sensor, pitch rate sensor, normal acceleration sensor, and the like, and it operates into the autopilot pitch axis fluid operated servomotor as in the monitor system of the Pesola patent. Channel B generates sensor excitation power and operates into an additional or added pitch axis fluid operated servo which is mechanically connected to main actuator 11 in parallel with the servomotor of channel A. Channel B is electrically and hydraulically independent of the channel A.

Each limiter channel contains the necessary electronics required to drive a pitch boundary indicator (PBI) of the aircraft and to control a warning horn for the craft. The desired channel A or B can be selected by means of a switch on a limiter control panel.

After takeoff of the aircraft has been effected, and when it is airborne and on MCSL, the two limiter channels A and B are "armed" by placing the channel A and B arming switches in the On position. These are solenoid held switches and open when the solenoids are not energized. With the aircraft being flown by manual control MCSL, both limit monitor channels are computing the flight condition boundary proximity or approach to the limit condition independently. In other words, each is computing the actual magnitude of the function to be limited. When the A limit boundary is reached, the channel A servomotor corresponding to servomotor 25 in Pesola will engage and control the aircraft to prevent the limit function or predetermined maximum flight condition from being exceeded.

The channel B boundary or maximum limit function is calibrated to the same boundary as channel A. However, when channel A is armed, the limit function in channel B is automatically biased to a fixed point above channel A to prevent simultaneous engagement of both monitor channels and thus of both servomotors.

Should a failure occur in the channel A monitor such that the A servomotor does not engage at the proper limit boundary and the aircraft reaches the higher B boundary, the channel B servo will engage and assume control of actuator 11. Engagement of channel B will cause channel A to be disarmed which releases the solenoid held arming switch for channel A on the control panel and turns on an indicator light, such as a channel A amber light. The B channel limit boundary is now faded or reduced down to the A boundary and limiting will be maintained at this level or magnitude.

When the aircraft is flown on automatic pilot CSL, rather than MCSL as when in Pesola switch arm 40 engages its lower contact 41, the bias on diode limiter 57 is removed. This permits centering of the trim ram 29 and engagement of contact arm 34 and contact 35. With MCSL arming switch 69 closed, the Channel A servo is engaged as the conventional autopilot pitch axis including sensors 60 controls the aircraft with this servomotor. Channel A is again the primary limiter channel. Should a failure occur on CSL such that limiting is not present at the A boundary and the B boundary is reached, channel B will engage and control. This results in automatic pilot disengagement and disarming of Channel A. Channel B's limit boundary will again fade or decrease to the A boundary level.

In the drawings:

FIG. 1 shows the redundant limiter channels A, B in block form; and

FIGS. 2A and 2B together show in somewhat detail the two limiter channels, A and B, including monitoring arrangement.

FIG. 1 in the central portion shows the A and B limiter channels. To the left thereof are various sources of sensed dynamic signals which coact to compute the limit function for the channels. To the right of the central portion are shown various portions of the system controlled by the limiter channels. Below the A and B limiter channels is a control panel with provisions for selecting either the A or B limiter channel to provide limiting action. Provisions are also included in this control panel to select which channel will operate a horn relay and the pitch boundary indicator shown at the right.

Referring to the sensors in the left in FIG. 1 and generally similarly as in the Pesola patent, mounted accelerometers 52 may sense normal acceleration of the aircraft. Similarly, a stabilator position sensor 54 supplies a control signal. A first pitch rate gyro 55 has its signal scheduled by a $q_c$ scheduling device to supply a further monitor channel signal. A second pitch rate gyro 55 also has its outputs modified in accordance with $q_c$ through a suitable device and also supplies a monitor signal. A left wing angle of attack probe 53 operates a transducer to supply an angle of attack signal for a monitor, and a second right wing angle of attack probe 53 through its transducer also supplies an angle of attack signal for a monitor. Also mach signals are supplied from sensor 27 and mach schedulers 28, for respective monitor channels. It is evident that accelerometer 52 supplies its output both to the A monitor channel and to the B monitor channel.

While the above signals namely normal acceleration, stabilator position, pitch rate, angle of attack and mach provide a suitable limit function for limiting the condition of an aircraft, as in Pesola, the limit function may be modified by the addition of an angular acceleration signal. Such angular acceleration signal is provided jointly by forward accelerometer 57 and an aft mounted accelerometer 57 which as shown in the FIG. supply the A channel and B monitor channel. However the generation by sensors of a function to be limited is not novel herein.

With respect to the remainder portion of FIG. 1, panel 61 is provided for the A and B monitor channels selection and arming. To advise the pilot of the craft of the operation of the monitoring arrangement a horn relay 62 may be energized and electrically in parallel therewith a pitch boundary indicator 63 is operated. Both the horn relay 62 and the pitch boundary indicator 63 which serves as warning indicators to the pilot of the aircraft may be controlled from either the A or B monitor channels. A landing gear switch 64 is included in a circuit that controls the operation of the command signal limiter 65, and this command signal limiter corresponds with the limiter when under automatic pilot control as in FIG. 1 of Pesola, when switch 40 therein engages contact 41. The command signal limiter 65 controls the A monitor channel servo, and the servo 25 for the B channel is controlled from its channel B limiter. A master caution light 73 may be provided to monitor, or track, similarity in response of the A and B limiter channels and to advise the pilot of the dissimilarity in the outputs of the monitor channel bridges should a dissimilarity exist.

The output of the A and B servos 25 is applied to a stabilator 11 which operates the stabilator position transducer 20 to supply a position signal to both the A and B monitor channel bridges.

With this general overview of the redundant monitor, details thereof will be now be described. Since the invention is concerned with providing redundancy in the limit function monitors, FIG. 1 omits the manual pilot controller that forms part of the aircraft overall control system.

Referring to FIG. 2B and on MCSL or limiting when on manual, a control surface 10 of an aircraft, which may be the stabilator or elevator surface thereof to control the craft about the pitch axis for changing a flight condition, is positioned by a power boost or main power actuator 11. The main actuator 11 may be of the fluid operated type conventionally comprising a piston or ram and a slidable control valve wherein the displacement of the piston is proportional to the displacement of the control valve. Such control valve may be displaced by an operating means 14 positioned by a linkage comprising a lever 15 tiltable on a fulcrum 16 on the craft. The valve operating means 14 may be directly positioned during MCSL by a manually operable pilot controller 17 such as a conventional aircraft control stick 18 pivoted on a fulcrum 19 fixed to the craft and having a link 20 extending therefrom connected to lever 15. During such operation of stick 18 when an A channel and a B channel servos are not engaged, conventional fluid bypass arrangements permits free movement of the pistons 24 of the servos.

Lever 15 may also be angularly displaced by the operation of a main piston 24 of a fluid type servomotor 25. The servomotor 25 is in the A monitor channel and the subject matter to be described unless otherwise designated is in the A channel. As in the Pesola patent, the servomotor 25 comprises essentially a transfer or control valve 26, a trim piston 29, and a solenoid-operated pilot valve 30 for controlling the servomotor engaged condition as shown in Pesola. Monitoring or limiting on the manual command signal from stick 18 may be introduced or may supplement the manual control, by manually closing solenoid held switch 67 FIG. 2A, also termed an arming switch, with the disengage switch 66 closed, thereby engaging switch arm 69 with contact 70 to complete a circuit for energizing switch arm 34 FIG. 2B. With the holding solenoid winding 68 deenergized, the switch arm 69 of arming switch 67 is disengaged from its contact 70 upon release of manual pressure.

The aircraft under response to operation of control surface 10 due to operation of the pilot controller 17, may change its angle of attack, pitch rate, mach or normal acceleration which signals are applied to the limiter network 51 FIG. 2A.

In the monitoring function, the output of the network 51, which output defines the actual limit function, modifies the fixed bias on diode limiter 57 from the fixed bias nose-up voltage source 44 thereby tending to decrease the total voltage on discriminator portion 36 of the servo amplifier. This results in the decrease in energization of the transfer valve 26 that operates its internal control valve resulting in a reduction of the displacement of its control valve from that initially caused by the bias. This decrease of displacement of valve 26 causes a consequent decrease in the differential pressure in fluid conducting conduits 32, 33. Since the trim piston 29 is biased by suitable coil springs as shown, it will move leftward with a decrease in the differential pressure in FIG. 2B. When there is no appreciable differential pressure in or between the pressures in conduits 32, 33 the piston 29 will have moved switch arm 34, now energized as stated, into engagement with resilient contact 35 to complete a circuit through conductor 80 (assume contact 95 is closed) to winding 47 displacing as shown in FIG. 2B a movable member of pilot valve 30. Thus there is applied, as shown in Pesola, operating pressure to valve 30 and in effect "engaging" the main piston 24 to the source of differential fluid pressure for subsequent operation of piston 24 upon further movement of transfer valve 26. A disengage delay 72 as in Pesola, is provided herein. Thus, when the manual control through stick 18 of control surface 10 causes the aircraft to respond and produce various sensed control quantities in limiter bridge 51 which quantities together equal the maximum desired magnitude of the limit function, the main servo piston 24 is "engaged" for control by valve 26. If the fixed bias from source 44 is exceeded by the limit function from limiter bridge 51, stabilator surface 10 will be moved to apply a nose-down effect thereby holding the craft response within the desired limit function magnitude. In other words, the limiter network 51 thereafter, following engagement of the main servo piston, for a desired limit function being exceeded by the response of the craft, there may be supplied additional control to the servo transfer valve 26 resulting in a differential pressure in conduits 32, 33 which would ordinarily cause the main piston 24 to move toward the left in FIG. 2B resulting as stated in downward displacement of the control surface 10 and nose-down of the aircraft. The command signal limiter 50 of channel A thereby prevents a flight condition of the aircraft to attain such value that the craft attains high pitch-up attitude or is overstressed.

The signals supplying two limiter bridges 51 represent acceleration from source 52, angle of attack from sensor 53, stabilator position from sensor 54, pitch rate from sensor 55 and mach from sensor 56.

During autopilot control, or CSL as distinct from manual control or MCSL, signals from sensors 60 are supplied to a conventional pitch axis bridge 39 which supplies its output to amplifier 38. With the selector switch 40 engaging the lower contact 41 or in autopilot engage position, the output of amplifier 38 is now applied to diode limiter 57.

Progressing to the redundant channel B, this channel includes a servomotor 25 FIG. 2B similar to that in channel A. The output displacement of piston 24 of motor 25 is transmitted through linkage 21 to the pivotal lever 15 in such a manner as to have the same moment arm thereon and similar operation for similar signals as piston 24 of servo 25 of channel A. The B channel does not include an autopilot section such as that comprising sensors 60 and pitch axis bridge 39.

It includes a similar limit function monitoring arrangement as in channel A and thus has a source of acceleration signal 52, a source of angle-of-attack signal 53, a source of a stabilator position signal 54, a pitch rate source 55 and a mach source 56. The signals from these sources are supplied to the limiter bridge 51 and thence to limiter 57 FIG. 2B, suitably biased from a source 44 when on MCSL, and thence through discriminator section 36 to the control valve 26 of the B channel servomotor.

PREARMING MONITOR

Thus far there has been described a control system for operating the control surface of an aircraft to alter a flight condition thereof which flight condition is monitored by two redundant channels when prearming or selecting of a channel has previously been made. A limiter prearming monitor 89, to be described, is provided in each channel to prevent the arming of the manual command signal limiter function in that channel by means of a arming switch 67 having operable arm 69 when a malfunction such as a faulty nose-down command initially exists in the system. Such malfunction is indicated by the existing engagement of contactor 34 with contact 35. But once the MCSL has been armed by placing switch arm 69 of arming switch 67 in a closed position, automatic engagement of the limiter servo 25 by leftward movement of valve 24 occurs when a limit boundary is reached. This attainment of the boundary is represented as stated by the closure of the MCSL engage switch 34, 35 on the servo 25 of either the A or B channels.

The circuit in channel A for providing the limiter prearming monitor function is shown in FIG. 2A comprising a relay winding 90, a diode 91 in parallel with winding 90, a PNP transistor 92, a resistor 93, a diode 97, and a resistor 98. The winding 90 of the relay is connected to the collector of transistor 92 having its emitter connected through conductor 100 directly to conductor 71, and transistor 92 is thus energized on switch arm 69 engaging contact 70. A series circuit comprising resistor 93, diode 97 and resistor 98 to ground provides a bias on the base of transistor 92 for causing its conduction and thereby energization of the winding 90 of the relay. A normally closed contact 94 operated by winding 90 is connected in electrical series to contact 35 engageable with arm 34. A conductor 80 extends from contact 35 to normally open relay contacts 95 which are connected thus in series with the contactor 34 and contact 35 to the conductor 81 in the energizing circuit of winding 47.

Under normal flight conditions, below the pitch boundary, or maximum limit function magnitude, the MCSL engage switch consisting of contactor 34 and contact 35 are open by virtue of the nose-up bias signal from bias source 44 applied to the servoamplifier and discriminator 36. The prearming monitor 89 allows the MCSL function to be energized by placing normally open relay contacts 95 in a closed position and closing contact 96 to energize a holding circuit for switch arm 69 when the arming switch 69 is closed at a time when the MCSL engage switch, contactor 34 and contact 35 are in a disengaged position. However, when the MCSL engage switch contactor 34 and contact 35 are closed before the time that the moveable arm 69 of the switch is actually closed, in this event in transistor 92 no base-emitter current is allowed to flow because diode 97 is back biased by the voltage developed across resistor 98 through the circuit comprising normally closed relay contact 94 and engage switch contactor 34, contact 35 conductor 71, closed switch 69, switch 66 and source 65 and winding 47 has an open circuit at contacts 95. However, once relay winding 90 is energized, normally closed relay contacts 94 are open, normally open relay contacts 95 are closed and relay contacts 96 are closed. Consequently, switch arm 69 of arming switch 67 must be operated to close contacts 95 before switch arm 34 is automatically operated and thus effective on winding 47, thus operation of the engage switch is monitored as to its normal or malfunction condition.

A similar prearming monitor is provided for the B channel, and because of their similarity no detailed description thereof for the B channel will be made.

As stated previously, after the airplane takes off, the two limiter channels are armed by placing the channel A and channel B arming switches having operable arms 69 in the closed position. Such action completes a circuit to energize relay windings 90.

In channel A, closing of the arming switch by operating arm 69 thus completes a circuit to contact 70 conductor 71, conductor 100 transistor 92, relay 89 which closes contacts 96 and thereby extending a circuit from contact 71, winding 68 and thence through normally closed relay contacts 107 energizing arming switch holding solenoid 68. Also in channel B, the closing of switch arm 69 energizes a holding winding 68 through a similar arrangement. Thus, the relay winding 90 is the prearming monitor of its respective channel.

If the aircraft is being flown by manual control MSCL as by operation by the control stick 18, both A and B channels are computing the boundary proximity independently. As the boundary is reached only the A channel servo normally will engage and control the aircraft to prevent the flight of the aircraft exceeding the limit function. The reason that only the channel A servo engages, even though the channel B boundary is calibrated to the same boundary as the A channel, is that when the A channel is armed as by closing its arming switch by operating arm 69 channel B is automatically biased to a fixed point above the boundary limit function of channel A to prevent simultaneous engagement of both channels.

GAIN CHANGE CIRCUIT

Such biasing arrangement is shown in FIG. 2A in channel B. The biasing arrangement of channel B may be termed a gain change circuit. Herein, a gain change circuit 101 comprises series resistors 102, 103 extending from the monitor bridge 51 to an amplifier 105 in the B channel. Resistors 102, 103 define a series signal path. At the junction of resistors 102, 103, a resistor 104 is connected to the drain of a field effect transistor 106. The source of field effect transistor 106 is connected to ground. The gate of field effect transistor 106 is connected through resistor 109 to ground and to the anode of a diode 110. The cathode of diode 110 is connected to the common connection of the anodes of diodes 111, 112, and to one end of a resistor 114 which has its opposite end connected through conductor 115 to conductor 71 associated with the arming switch having operable arm 69 of the A channel. The cathode of diode 111 is connected to ground. The cathode of diode 112 is connected to the negative side of a polarized capacitor 117 and to one end of a resistor 118. The positive end of the capacitor is connected to ground and the opposite end of the resistor 118 is connected to a $-12$ volt supply.

With respect to the operation of the B channel gain changing arrangement 101, with the switch arm 69 of the A channel arming switch in an open position, current in the gain changer 101 is established from ground through resistor 109, diodes 110, 112 and resistor 118 to apply a negative voltage to the gate-source diode of the field effect transistor 106. Field effect transistor 106 is turned Off or nonconducting and thus the currents flowing into resistor 103 is equal to the current leaving resistor 102 and thus the limit function signal in limiter bridge 51 of B channel has the same effect on the limiter 57 in its channel as does the limiter bridge 51 in the A channel have on its limiter 57. However, when the arming switch, by engaging contactor 69 and contact 70 of the A channel is closed and a +voltage is supplied to conductors 71 and 115, diode 110 is back biased and thus nonconducting and thus no current flows through resistor 109, hence removing the cutoff bias supplied to field effect transistor 106 turning it On whereby some of the output current through resistor 102 passes through resistor 104 to ground so that the total output of limiter bridge 51 of the B channel is not applied to amplifier 105 and thence to the limiter 57. In effect, a higher limit function output from limiter bridge 51 of the B channel is now required before the bias on diode 57 of B channel is overcome; thus in effect the limit function is raised in the B channel when the A channel is engaged. The +28 volts DC on conductor 115 through diode 112 discharges the capacitor 117, and since there is considerable time constant for the charging of capacitor 117, the voltage at the gate of field effect transistor 106 becomes slowly more negative, once the +28 volts DC is removed from conductor 115.

Thus the field effect transistor 106 between the drain and the source acts as a resistance whose magnitude is dependent upon the voltage supply at the gate. Thus the voltage applied to resistor 102 is essentially applied to a variable voltage divider made up of resistor 102 and the combination of resistor 104 and the variable resistance of the field effect transistor 106. Thus when the gain circuit is placed in the input of the amplifier 105, the gain of the amplifier in effect undergoes a decrease to some new lower steady state gain, or gradually undergoes an increase depending upon whether +28 volts DC or an open circuit is applied to conductor 115.

Thus while the B channel limit boundary is calibrated to the same boundary as that of the A channel, yet when the A channel is armed by closing of operable contact 69 of its arming switch, the B channel is automatically biased to a fixed value above that of channel A to prevent simultaneous engagement of both monitor channels A, B to control actuator 11.

However, should a failure occur in the A channel such that the servo 25 thereof does not engage, e.g., switch 34 be moved to its extreme leftward position to energize winding 47 and thereby move valve 30 leftward to unblock channels 32, 33 at the proper boundary, and the aircraft reaches the B boundary, the B channel servo will engage and assume control of its actuator 24 and main actuator 11. The engagement of the B channel servo will cause the channel A to be disarmed. This disarming is effected by the operation of the switch arm 34 in the B channel which by operating means 120 effects a control to open contacts 107 which is associated with the holding circuit for winding 68 of the solenoid-held arming switch in the A channel. Such control from the switch arm 34 of the B channel is illustrated by suitable operative means 120 extending from switch arm 34 to normally closed contacts 107. It is evident that the closing of switch 34 with its related contact in the B channel may similarly but alternatively control a relay for opening a set of relay contacts such as contacts 107 in the A channel associated with its arming switch. Thus with the release of the operable arm 69 from contact 70 in the arming switch in the A channel, conductor 71 of the A channel is no longer energized and no +28 volts signal is applied to the end of resistor 114 and thus briefly by charging capacitor 117 through the circuit including resistor 109 the B channel boundary is faded down to the A boundary and limiting will be maintained at this level since field effect transistor 106 is non-conducting at this time.

VOLTAGE MONITOR

A monitor 130 for the 12 volt supply (plus or minus) used in the control system is provided for the energizing circuit of switch arm holding winding 68 of the A channel in FIG. 2A. A like monitor is provided for channel B. As to details, this A channel plus or minus 12 volt monitor 130 which is used to detect failure in either the plus or minus 12 volt power supply in channel A includes a detector transistor 131. The emitter of the detector transistor 131 is connected directly to a plus 12 volt supply. The base of the detector transistor 131 is connected through a small resistor 134 to the cathode of a 13 volt Zener diode 135. The anode of the Zener diode is directly connected to the −12 volt supply. Collector 137 of transistor 131 is connected through a resistor 139 to a base of a common emitter relay driver transistor 140. The collector 141 of transistor 140 is connected to the lower end of relay winding 68 in the A channel and the emitter thereof is connected to ground.

The operation of the plus or minus 12 volt monitor circuit 130 is as follows. With both the plus and minus 12 volt supplies operating the +12 volts is supplied to the emitter of transistor 131 and minus 12 volts is supplied to the anode of Zener 135, the base emitter junction of transistor 131 is forward biased and a current flows from the collector 137. Thus with the detector transistor 131 turned On the relay driver transistor 140 is also turned On. Thus, with both the plus and minus 12 volt supplies properly operating, the circuit is completed through relay winding 68 upon closing of the arming switch 69 by engaging with contact 70. The B channel has independent +12, −12 voltage sources from channel A.

However if the −12 volt supply fails either in an open condition or a short circuit condition, the action of the 13 volt Zener 135 will block the flow of current in the emitter-base portion of transistor 131 and the current flow from the collector 137 will be cut off. Thus the transistor 140 is nonconducting and the circuit through switch holding winding 68 is interrupted and the A channel arming switch moves automatically to the unoperated position with arm 69 disengaged from contact 70.

If the +12 volt supply through emitter of transistor 131 fails through either a short circuit or an opening condition, there will obviously be no current flowing from the collector 137 of transistor 131 to the holding winding driver transistor 140 and again the circuit through holding winding 68 will be open and operable arm 69 of the arming switch will move to an unoperative or circuit opening position.

Thus the monitor circuit 130 provides a relay function or arming switch opening function whenever either or both of the 12 volt supply fails to an open or a short circuit condition.

Thus on failure of the −12 volt supply to the gain changer 101 of channel B, FIG. 2A and the channel B +12, −12 volt monitor also, the circuit through switch-holding winding 68 will be interrupted by the monitor 130 causing switch arm 69 to move conventionally on deenergization of winding 68 to the open circuit position so that the B channel will not be engaged.

In the B channel, gain circuit 101 on loss of voltage from the minus 12 volts supply, in channel A, field effect transistor 106 is then biased from ground, the voltage source, through conductor 109, causing it to be conductive, thereby decreasing the gain so that the total current from resistor 102 would appear to resistor 103 and therefore the B channel would operate at the same limit boundary as would channel A. Upon consequent release of the channel B arming switch, such release may be used to energize an indicator such as a light serially electrically arranged relative to the arming switch 69 or the change in position of the arming switch may be observed.

It will now be apparent that I have provided a novel redundant monitor limiter for a condition control system wherein but one monitor channel of the limiter is in operation at a time to limit the magnitude of the condition, and that upon failure of one channel normally effective to provide limiting of the redundant channel limiter, the remaining channel will function to limit the magnitude of the condition to the same quantity as did the one normally effective or primary channel. It will also be evident that I have provided a novel arming and engagement monitor for a limiter channel which prevents control by a limiter channel if a proper selection or arming of a channel has not been activated prior to the normal attainment of the limiting value for the condition due to a faulty nose-down condition. It will also be evident that I have provided a novel redundant limiter system for controlling a condition wherein one channel is a primary limiter channel and that a second channel during effectiveness of the primary channel includes a gain changer to provide it with a different limit function from the primary channel but that such limit function becomes equal to that of the primary channel on failure of the primary channel so that the condition is limited to the same magnitude, and that operation of the gain changer is monitored so that on failure thereof to make the proper change in magnitudes of the limit function as by lack of control voltages to the gain changer, an indication of such lack as on a pitch boundary indicator is given.

I claim:

1. In combination with control apparatus having a first means operating a member for changing a condition:
- a second means limiting the magnitude of the condition, comprising a pair of condition-monitoring channels, each condition-monitoring channel having sensing means responsive to said condition and determining a maximum magnitude for the condition;
- a third means controlled by either monitoring channel for opposing a change in the condition above the predetermined magnitude such as caused by operation of the member; and
- a fourth means preventing concurrent control of said last named or third means by both monitoring channels.

2. The apparatus of claim 1, wherein said fourth means includes means for preselecting or arming each condition-monitoring channel for subsequently opposing said change in the condition; and means in one or a first channel effective on selection thereof for operation for altering the magnitude of the predetermined condition in the other or second channel to prevent concurrent operation of both channels for opposing a change in the condition.

3. The apparatus of claim 2, and means in said other or second channel effective on its opposing change in the condition beyond the predetermined condition, rendering the arming means governing the first channel ineffective.

4. The apparatus of claim 1 wherein the means controlled by either channel for opposing a change in the condition above a predetermined magnitude comprises a normally inoperative servomotor means rendered effective to operate the member for changing the condition upon the attaining of the predetermined condition.

5. The apparatus of claim 4 wherein the third means includes also a selecting means for selecting a channel for opposing a change in the condition above the predetermined magnitude, and wherein the means for rendering the servomotor means effective comprises means jointly controlled by said selecting means and by means including the condition responsive means, in a channel.

6. The apparatus of claim 5, and prearming monitoring means for said selecting means for preventing the operation of the servo means in the event that the selecting or arming means is operated subsequently to the attainment of the predetermined condition affecting said sensing means.

7. In control apparatus for operating a condition control member, said control apparatus including a sevomotor means for operating the control member to affect said condition, said sevomotor means having an operable servomotor means controller, in combination therewith:
- means including an operable servocircuit-providing member for jointly with the servomotor means controller, while operated, energizing the servomotor means;
- a manually operable arming or settable member;
- a second operable member normally responsive to change of said condition, said two members jointly controlling operation of said servocircuit-proving member; and
- prearming monitoring means responsive to operation of said second member, due to change in the condition, prior to operation of said arming member, preventing operation of said servocircuit-providing member.

8. The apparatus of claim 7, wherein the apparatus controls an aircraft and means responsive to a flight condition of the craft, such as the craft tending to exceed a predetermined flight condition, operates said servocontroller.

9. The apparatus of claim 8, wherein the control apparatus includes means moving said flight condition control member and causing the craft response thereto to change said condition.

10. The apparatus of claim 7, wherein the prearming monitoring means responsive to the second member includes a normally open, circuit-closing means, with the monitoring means also responsive to operation of said arming member prior to operation of said second member operating said circuit-closing means for operating the servoengage member.

11. The apparatus of claim 2, and means in said second or other channel effective during its opposing change in the condition beyond the predetermined condition, rendering the first channel ineffective to control the condition.

12. The apparatus of claim 2, wherein the means for arming a channel includes solenoid-holding means energized upon operation of said arming means; and
- voltage monitoring means connected in circuit with the solenoid-holding means, interrupting passage of current through the solenoid upon loss of voltage to said voltage monitor.